United States Patent [19]

Tsai

[11] 4,047,560

[45] Sept. 13, 1977

[54] REGENERATOR FLOW CONTROL

[75] Inventor: Yih-Wan Tsai, O'Hara Township, Allegheny County, Pa.

[73] Assignee: PPG Industries, Inc., Pittsburgh, Pa.

[21] Appl. No.: 594,153

[22] Filed: July 8, 1975

[51] Int. Cl.² .............................................. F28D 17/00
[52] U.S. Cl. ................................... 165/9.3; 432/180; 65/337
[58] Field of Search ............................. 165/9.1–9.4; 432/179, 180; 65/337

[56] References Cited

U.S. PATENT DOCUMENTS

| 490,726 | 1/1893 | Stevenson | 165/9.3 |
|---|---|---|---|
| 1,165,340 | 12/1915 | Orth | 165/9.3 X |
| 1,836,412 | 12/1931 | Trinks | 165/9.3 X |
| 1,904,236 | 4/1933 | Irwin | 165/9.3 |
| 2,813,708 | 11/1957 | Frey | 165/9.3 |
| 3,378,897 | 4/1968 | Hanley | 432/179 X |
| 3,912,485 | 10/1975 | Green | 65/337 X |

Primary Examiner—Albert W. Davis, Jr.
Attorney, Agent, or Firm—Dennis G. Millman

[57] ABSTRACT

In a regenerative furnace of the type used for melting glass, localized overheating of the regenerator packing is minimized, heating of the regenerator packing is made more uniform, and regenerator efficiency is improved by employing a movable baffle in the space beneath the regenerator packing and/or by a baffle in the plenum above the packing.

6 Claims, 7 Drawing Figures

REGENERATOR FLOW CONTROL

BACKGROUND OF THE INVENTION

This invention relates to regenerative furnaces and their operation, and in particular to the type of regenerative furnace commonly employed in the manufacture of flat glass. The regenerators used in such furnaces are usually comprised of a gas-pervious bed of refractory material, such as a stacked arrangement of bricks, sometimes called "checker packing", through which hot exhaust gases are passed during one cycle in order to heat the packing. In alternate cycles, the flow is reversed and the heat stored in the packing serves to preheat combustion air passing through the regenerator. The regenerators are generally employed in pairs, with one on either side of the combustion chamber. While one regenerator is absorbing heat from the exhaust gas, the other is heating incoming air.

Because flat glass furnaces typically include a relatively large number of burner ports (usually about four to eight on each side) spaced several feet apart from one another, the length of a regenerator bed associated therewith usually has a length which is several times greater than its height or width. And because of construction expediencies, the main flue carrying gases to and from each regenerator is usually located at one end of the regenerator. This arrangement unfortunately sets up lateral flow in the upper plenum and therefore an uneven flow distribution in the regenerator packing during the exhaust cycle, which has been found to cause the portion of the packing near the flue to become hotter than other portions of the packing. This localized overheating may often be reinforced in the subsequent firing cycle, during which the flow of incoming air has been detected favoring the end of the packing away from the flue so that the flue end is cooled less than the remainder of the packing. As a result, the flue end portion of the packing tends to deteriorate faster than others, thereby shortening furnace life. Furthermore, because the stored heat is concentrated in one portion of the packing, the efficiency with which air is preheated in the firing cycle is reduced. It is an object of the present invention to overcome these disadvantages.

U.S. Pat. Nos. 1,836,412 and 2,813,708 relate to modifying the flow patterns in regenerators. Both employ rigid baffles designed primarily for the purpose of rendering the air flow through the checker packing more uniform during the firing cycle. It is not apparent, however, how such arrangements could sufficiently influence flow in the opposite direction through the packing during the exhaust cycle to avoid concentrating heat at the flue end of the packing. Moreover, such baffle arrangements could change the gas flow pattern in the space beneath the packing during the exhaust cycle, thereby promoting lateral flow of the exhaust gases along the plenum above the packing and then into the packing at the flue end.

SUMMARY OF THE INVENTION

In accordance with one aspect of the present invention, there is provided one or more movable baffles beneath the packing near the flue entrance to each regenerator, which deflect a substantial portion of the incoming air flow during the firing cycle into the portion of the checker packing nearest the flue, thereby preferentially cooling that portion. When the cycle is reversed, the baffle is retracted so as to not interfere with the normal exhaust gas flow pattern. Since the flue end of the packing will thereby have been cooled more than other portions during the firing cycle, the subsequent uneven flow of exhaust gases will not cause an excessively unbalanced temperature rise at the flue end. Thus inordinate concentration of heat at the flue end is substantially reduced and thermal energy is more efficiently utilized.

Another set of baffles, which may be used either alone or in combination with the first-mentioned baffles, may be located in the plenum above the packing so as to discourage lateral flow along the plenum during the exhaust cycle, thereby alleviating the channeling of exhaust gases through the packing at the flue end. These later baffles need not be movable.

BRIEF DESCRIPTION OF THE INVENTION

DETAILED DESCRIPTION

Figure 1:
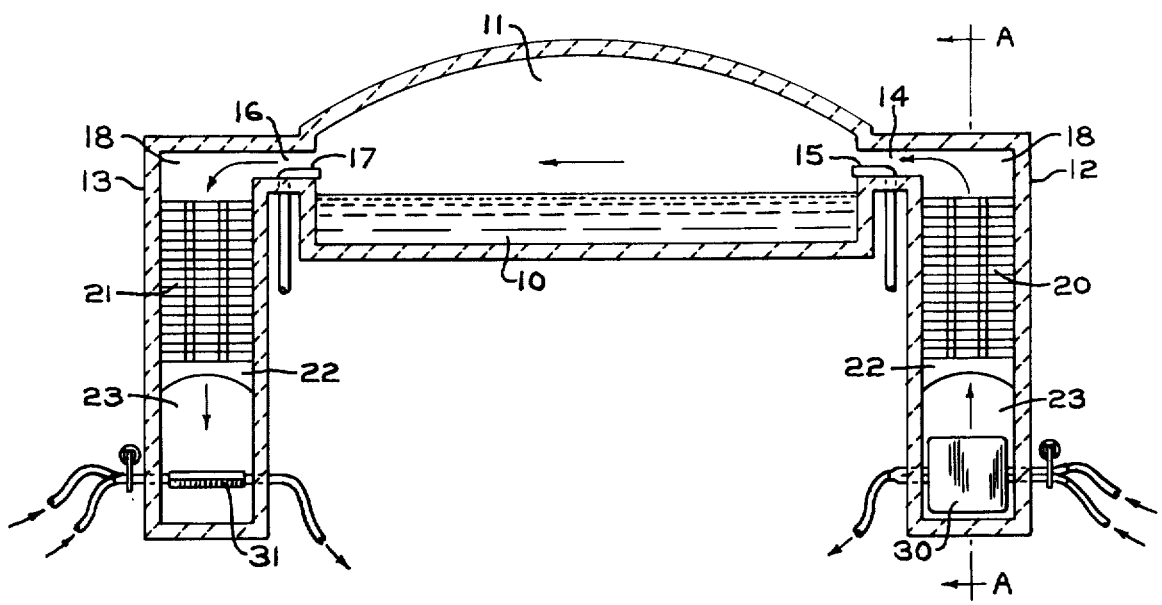
FIG. 1 is a schematic, vertical section across the width of a cross-fired, regenerative, glass-melting furnace, showing a preferred placement of movable baffles.

The regenerative furnace shown in FIG. 1 is typical of the melting furnaces used in the flat glass industry. It should be understood that such a furnace is being described as an illustrative example, and that the invention is applicable to regenerative furnaces of other types. In FIG. 1, a pool of molten and partially melted glass 10 is contained in a melting zone 11 which also serves as the combustion chamber. Regenerators 12 and 13 flank the combustion chamber and communicate therewith by means of a plurality of burner ports 14 and 16, respectively. Fuel is supplied by pipes 15 or pipes 17. Air for combustion passes upwardly through regenerator 12, where it is preheated by passing over a hot, gas-pervious, brickwork checker packing bed 20 made of refractory materials, and then through ports 14 where it combines with fuel from the pipe 15 at the mouth of each port. Flames issue a considerable distance into combustion chamber 11, and hot exhaust gases pass through ports 16 and into the opposite regenerator 13, where the exhaust gases heat another brickwork checker packing 21. The mode of operation shown in FIG. 1 is a firing cycle with respect to regenerator 12 and an exhaust cycle with respect to regenerator 13. After several minutes of operation, the flows are reversed so that regenerator 13 serves to preheat combustion air, and flames issue from left to right from ports 16 in FIG. 1. Regenerator 12 would then be in an exhaust cycle. After a few more minutes the direction of firing is again reversed, and so on.

Figure 2:
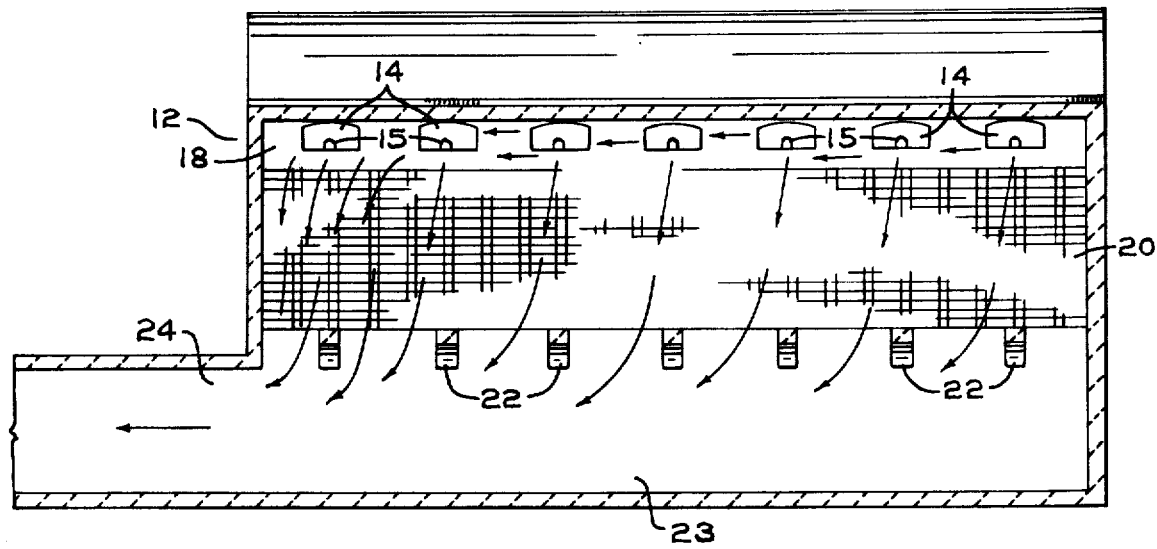
FIG. 2 is a vertical section of a regenerator, taken along line A—A in FIG. 1, showing the flow pattern during an exhaust cycle without baffles.
Figure 3:
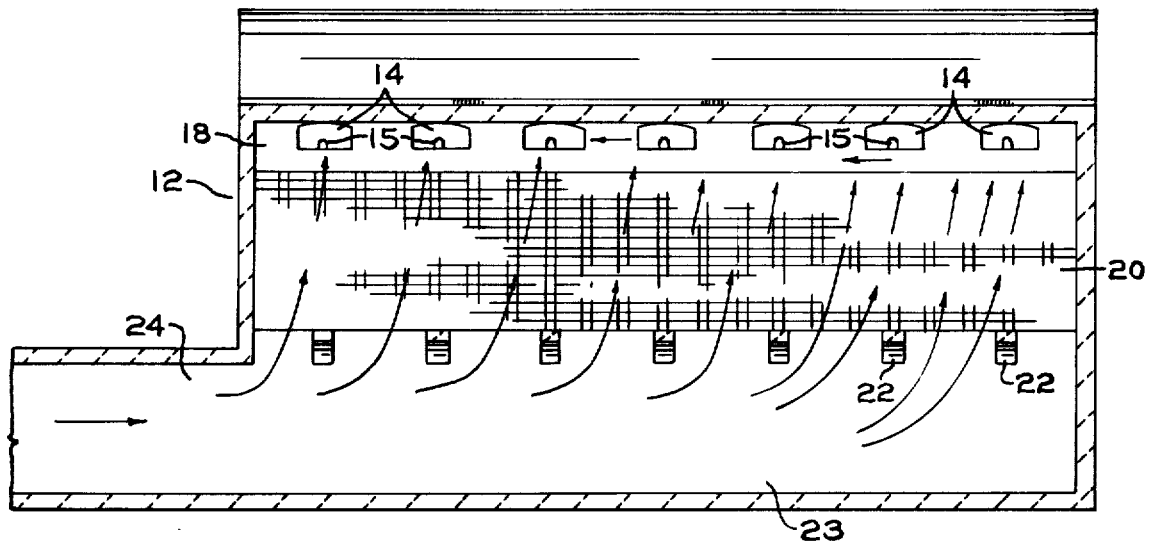
FIG. 3 is a vertical section of a regenerator, taken along line A—A in FIG. 1, showing the flow pattern during a firing cycle without baffles.

Typical flow patterns through the checker packing prior to the present invention may be seen in FIGS. 2 and 3, where lengthwise cross-sections of regenerator 12 are shown. It can be seen there that checker packing 20 rests upon arches 22, leaving an air distributing space 23 below, which is open at one end to a flue 24. A plenum 18 above the packing communicates with a number of burner ports 14. The regenerator is shown serving seven burner ports, a typical number in a large flat glass melting furnace, but the number could be greater or smaller. FIG. 2 depicts an approximation of the flow pattern during an exhaust cycle without the improvements of the present invention. A portion of the exhaust gases tend to be drawn laterally along the plenum, toward the flue end of the regenerator, and then down into the packing near the end. The resulting greater amount of exhaust gas flowing through the flue end of the packing causes that portion of the packing to become hotter than the remainder of the packing. However, in the firing cycle, when flows are reversed (FIG. 3), the air flow through the packing, and therefore the cooling effect, has been found to be somewhat biased toward the opposite end from the flue. As a result, the checker packing near the flue end has been found to continually remain at a higher temperature than the rest of the packing. The region of this inefficient and sometimes harmful concentration of heat is, of course, not discrete, and it depends upon the particular configuration of a regenerator, but it can be said to generally consist of about the first one-third of the packing from the flue end.

Figure 4:
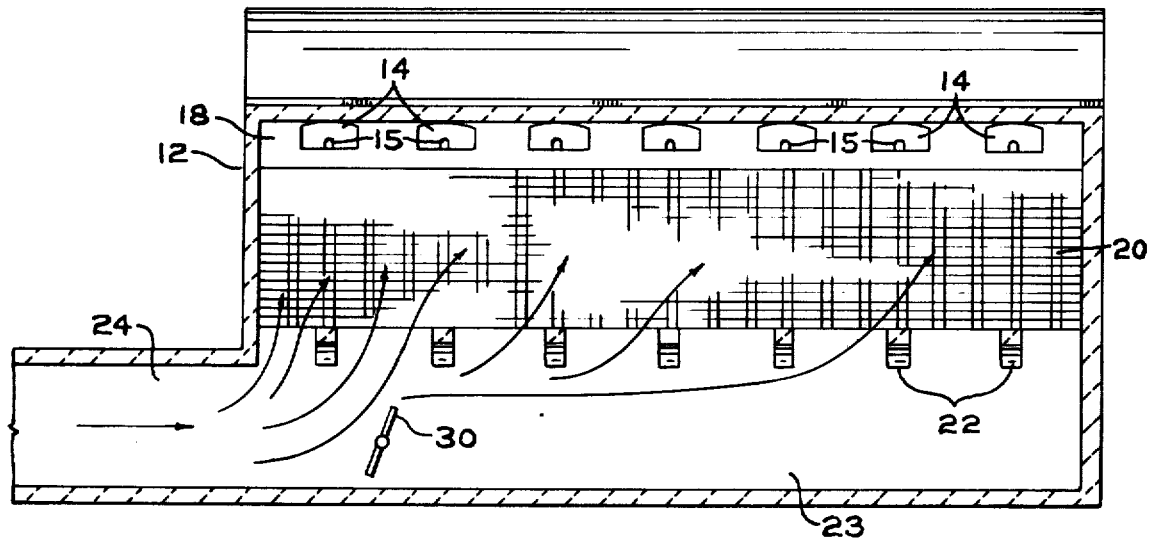
FIG. 4 is a vertical section of a regenerator, taken along line A—A in FIG. 1, showing the flow pattern during a firing cycle with a baffle being deployed.

The following Table shows an example of the thermocouple temperature readings of a seven port regenerator having approximately the same geometric configuration as that shown in the figures. The temperature readings were taken at the top surface of the packing, within the packing about one third of its height from the top, within the packing about one third of its height from the bottom, and in the airspace below the packing, beneath each of ports one, three, five, and seven (counting from the flue end). It can be seen from the Table that the temperatures at the flue end continually remain higher than any other portion of the regenerator. In fact, in this example, the minimum temperature ⅓ the height below the first port is even higher than the maximum temperatures for most portions of the packing.

deflecting position for a firing cycle, and baffle 31 is shown (FIG. 1) in a retracted, nearly horizontal, exhaust position. When the firing is reversed, the baffles are rotated about a horizontal axis so as to assume the opposite positions. The effect of such a baffle on the air flow during a firing cycle is shown in FIG. 4. Baffle 30, shown mounted, as an example, between the first and second ports, deflects air upward into the flue end of the checker packing, thereby preferentially cooling that portion of the packing. When baffles, such as baffle 30, are employed only in the lower air distributing space, their most effective location would be underlying approximately the first one-third of the checker pacing from the flue end. In the exhaust cycle, baffle 30 is rotated so that its major surface is essentially parallel to the lines of flow around it, or nearly horizontal, so as to minimize resistance to the exhaust gas flow. The flow pattern of the exhaust cycle would then be substantially unchanged from that shown in FIG. 2.

Figure 5:
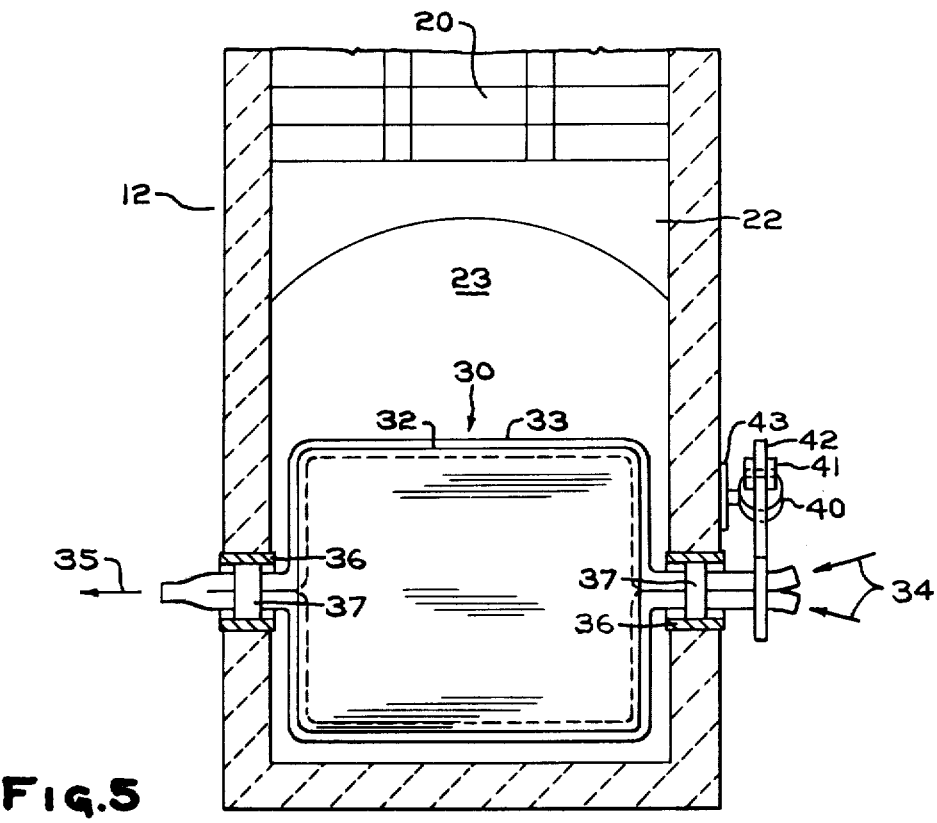
FIG. 5 is an enlarged view of one of the movable regenerator baffles shown in FIG. 1, showing constructional details of the preferred embodiment.
Figure 6:
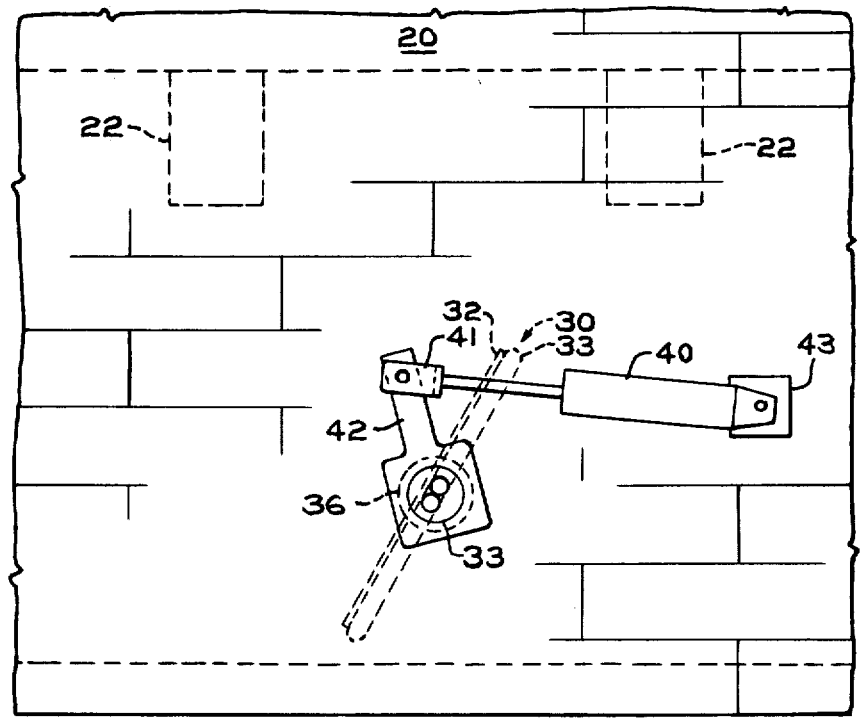
FIG. 6 is a side view of the baffle shown in FIG. 5.

Details of the preferred movable baffle arrangement and the rotating mechanism used therewith may be seen in FIGS. 5 and 6. The body of the preferred baffle 30 is formed from a sheet of metal 32 having cooling pipes 33 welded to its periphery. Cooling water enters at 34 and is drained at 35, preferably following two independent paths around the baffle to assure equal cooling on both sides. Sleeves 36 and bearings 37 rotatably support the baffle within the regenerator chamber. Movement of the baffle is effected by a hydraulic cylinder 40 acting through linkage 41 and lever 42. Lever 42 is affixed to the cooling pipes 33. Cylinder 40 is pivotally mounted on a support 43 which may be attached to the regenerator wall or any other stationary structural member nearby. Preferably, the cylinder is actuated automatically by the same control means used to control the furnace firing cycles.

Preferred baffle 30 is large enough to block about one half of the air distributing space when in the deflecting position, but the size may vary in accordance with the particular requirements of a given regenerator. Moreover, two or more baffles, which may be of different sizes, may be employed in each regenerator to direct the air flow more precisely. It is also permissible to locate the baffles in the upper portion of air distributing space 23, rather than in the bottom half as shown in the drawings. Other variations contemplated by the invention

TABLE I

| Peak Temperatures (Exhaust Cycle) | | | | |
|---|---|---|---|---|
| | PORTS | | | |
| | 1 | 3 | 5 | 7 |
| Top | 2861° F. (1572° C.) | 2791° F. (1533° C.) | 2690° F. (1477° C.) | 2598° F. (1426° C.) |
| ⅓ from Top | 2715° F. (1491° C.) | 2550° F. (1399° C.) | 2250° F. (1232° C.) | 2081° F. (1138° C.) |
| ⅓ from Bottom | | 2215° F. (1213° C.) | 1920° F. (1049° C.) | 1751° F. (955° C.) |
| Bottom Airspace | 1860° F. (1016° C.) | 1700° F. (926° C.) | 1575° F. (857° C.) | 1470° F. (799° C.) |
| Minimum Temperatures (Firing Cycle) | | | | |
| Top | 2710° F. (1488° C.) | 2600° F. (1427° C.) | 2482° F. (1361° C.) | 2378° F. (1303° C.) |
| ⅓ from Top | 2645° F. (1452° C.) | 2470° F. (1354° C.) | 2122° F. (1161° C.) | |
| ⅓ from Bottom | | 2065° F. (1129° C.) | 1765° F. (963° C.) | 1680° F. (915° C.) |
| Bottom Airspace | 1505° F. (818° C.) | 1463° F. (795° C.) | 1435° F. (779° C.) | 1408° F. (764° C.) |

FIGS. 1 and 4 show the locations of a specific, preferred embodiment of a baffle means in accordance with the present invention. Baffles 30 and 31 are rotatably mounted in the air distributing space 23 of regenerators 12 and 13, respectively. Baffle 30 is shown in an air-include mounting the baffles so as to rotate about a vertical axis rather than a horizontal axis, or mounting the baffles to swing about one edge thereof, either horizontally or vertically. The movement of the baffles may also be reciprocation through slot openings in the bottom or side walls of the regenerators. The location of the baffle (or baffles) along the length of each regenerator depends upon the temperature profile in the particular regenerator, but in order to deflect air where it is most needed, the baffles should underlie the first one-third of the checker packing from the flue end when baffles in the air distributing space alone are used. Additional baffles may be placed beneath the remainder of the packed bed if further shaping of the flow is desired.

Figure 7:
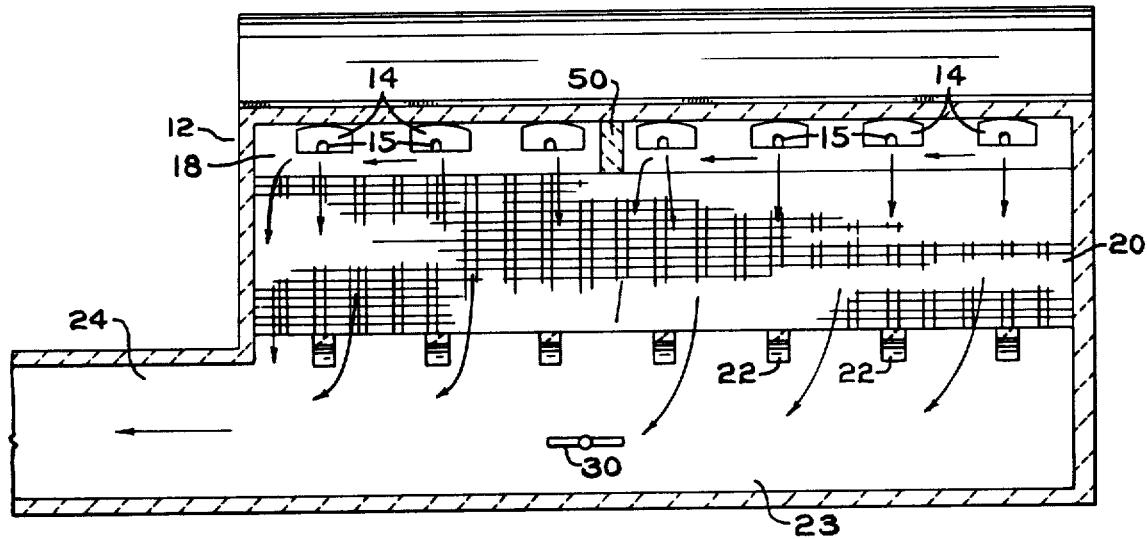
FIG. 7 is a vertical section of a regenerator with a movable lower baffle and rigid upper plenum baffle, showing the flow pattern during an exhaust cycle.

Referring now to FIG. 7, there is shown another variant of the present invention whereby a baffle 50 is placed in plenum 18 above the checker packing so as to impede lateral flow of exhaust gases along the plenum during the exhaust cycle and to direct the gases into the packing. The heating effects are thereby more evenly distributed along the length of the regenerator. Baffle 50 need not be movable, so it may conveniently consist of a rigid wall of refractory material which divides the plenum into two sections. Baffle 50, as shown, completely blocks lateral flow along the plenum, but the baffle may extend only part of the way across the plenum, or on the other hand, it may extend below the top of the packing or even all the way to the bottom of the packing. The plenum may be provided with more than one baffle, but it is generally not desirable to isolate a single burner port 14 from all other burner ports, since blockage of a portion of the checker packing beneath that port could in that case put that port out of service. For example, no more than two plenum baffles should be employed in the seven-port regenerator shown in FIG. 7. When a plenum baffle is provided, a lower baffle 30 is optional, but when used, baffle 30 is preferably located directly opposite the plenum baffle, which in the specific embodiment shown in FIG. 7, is approximately midway along the length of the regenerator packing.

It is to be understood that other modifications and variations as are known to those of skill in the art may be resorted to without departing from the spirit and scope of the invention as defined by the appended claims.

I claim:

1. In a regenerative furnace of the type comprising a combustion chamber, a pair of regenerator chambers, a plurality of burner ports spaced along the sides of the combustion chamber providing for the alternate passage of air and exhaust gases between the combustion chamber and the regenerator chambers, and fuel feeding means associated with each burner port, and in which each regenerator chamber includes a gas-pervious bed of refractory material, a plenum communicating with one side of said bed along its length and with said burner ports, an air distributing space communicating with the opposite side of said bed along its length, and a flue communicating with said air distributing space at one end thereof, the improvement comprising:
   a movably mounted baffle in the air distributing space of each regenerator chamber within the first one-third of the air distributing space from the flue end adapted to deflect air passing from said flue into an adjacent portion of said refractory bed; and
   means for selectively moving each of said baffles into and out of an air flow diverting position.

2. The furnace of claim 2 wherein each of said baffles is pivotally mounted.

3. The furnace of claim 1, further including a baffle in each plenum adapted to deflect exhaust gases, which are passing from said burner ports through the plenum, into an adjacent portion of said refractory bed.

4. The furnace of claim 3 wherein said movably mounted baffles and said plenum baffles are located approximately midway along the length of said refractory bed.

5. In a regenerative furnace of the type comprising a combustion chamber, a pair of regenerator chambers, a plurality of burner ports spaced along the sides of the combustion chamber providing for the alternate passage of air and exhaust gases between the combustion chamber and the regenerator chambers, and fuel feeding means associated with each burner port, and in which each regenerator chamber includes a gas-pervious bed of refractory material, a plenum communicating with one side of said bed along its length and with said burner ports, an air distributing space communicating with the opposite side of said bed along its length, and a flue communicating with said air distributing space at one end thereof, the improvement comprising:
   a baffle in each plenum extending across substantially the full cross-sectional area of the plenum so as to block the flow of exhaust gases parallel to the top of said refractory bed.

6. The furnace of claim 5 wherein each of said baffles is a rigid refractory wall.

* * * * *